(12) United States Patent
Vau et al.

(10) Patent No.: US 8,339,469 B2
(45) Date of Patent: Dec. 25, 2012

(54) PROCESS FOR AUTOMATICALLY DETERMINING A PROBABILITY OF IMAGE CAPTURE WITH A TERMINAL USING CONTEXTUAL DATA

(75) Inventors: Jean-Marie Vau, Paris (FR); Thierry Lebihen, Bourg la Reine (FR); Eric Masera, Paris (FR); Christophe Edmond Maurice Papin, Bois Colombes (FR); Santie Valérie LourdesMarie Adelbert, Vincennes (FR)

(73) Assignee: Eastman Kodak Company, Rochester, NY (US)

( * ) Notice: Subject to any disclaimer, the term of this patent is extended or adjusted under 35 U.S.C. 154(b) by 632 days.

(21) Appl. No.: 12/529,932

(22) PCT Filed: Mar. 3, 2008

(86) PCT No.: PCT/EP2008/001645
§ 371 (c)(1),
(2), (4) Date: Jan. 5, 2010

(87) PCT Pub. No.: WO2008/107138
PCT Pub. Date: Sep. 12, 2008

(65) Prior Publication Data
US 2010/0165076 A1    Jul. 1, 2010

(30) Foreign Application Priority Data

Mar. 7, 2007 (FR) ...................................... 07 01624

(51) Int. Cl.
*H04N 5/228* (2006.01)
(52) U.S. Cl. ............ 348/222.1; 348/231.7; 348/E5.031; 348/E7.001; 348/E3.029; 348/E3.031; 382/309
(58) Field of Classification Search ............... 348/222.1, 348/231.7, E5.031, E7.001, E3.029, E3.031; 382/209
See application file for complete search history.

(56) References Cited

U.S. PATENT DOCUMENTS

| | | | |
|---|---|---|---|
| 6,623,428 B2 * | 9/2003 | Miller et al. ................... 600/300 |
| 7,535,511 B2 * | 5/2009 | Wu et al. ........................ 348/364 |
| 7,606,437 B2 * | 10/2009 | Gallagher ...................... 382/260 |
| 8,059,163 B2 * | 11/2011 | Rimon et al. ............... 348/222.1 |
| 8,149,288 B2 * | 4/2012 | Nakagomi et al. .......... 348/222.1 |
| 8,156,116 B2 * | 4/2012 | Graham et al. ................ 707/728 |
| 2004/0174434 A1 * | 9/2004 | Walker et al. ............... 348/211.3 |
| 2006/0103731 A1 * | 5/2006 | Pilu et al. .................. 348/207.99 |
| 2006/0282788 A1 * | 12/2006 | Paalasmaa et al. ............ 715/764 |
| 2007/0160294 A1 * | 7/2007 | Asano ............................ 382/190 |
| 2007/0237355 A1 * | 10/2007 | Song et al. ..................... 382/100 |
| 2008/0052026 A1 * | 2/2008 | Amidon et al. ................ 702/104 |
| 2008/0144937 A1 * | 6/2008 | Lim et al. ....................... 382/181 |
| 2008/0266429 A1 * | 10/2008 | Noraz et al. ................... 348/247 |
| 2009/0059021 A1 * | 3/2009 | Rimon et al. ............... 348/222.1 |
| 2009/0091633 A1 * | 4/2009 | Tamaru .................... 348/208.14 |
| 2009/0285492 A1 * | 11/2009 | Ramanujapuram et al. .. 382/209 |
| 2011/0279700 A1 * | 11/2011 | Steinberg et al. .......... 348/222.1 |

* cited by examiner

*Primary Examiner* — Alina N. Boutah
(74) *Attorney, Agent, or Firm* — Kevin E. Spaulding

(57) ABSTRACT

A process for using a terminal capable of capturing images to determine a probability of capturing the images according to information taken from contextual data provided by the image capture means. The process uses a terminal such as a mobile terminal comprising a first image data sensor and at least one contextual data sensor to automatically determine at least one probability of capturing an image or a sequence of images taking place within a time interval, the capture probability being calculated based on at least one response provided by one of the activated image data and/or contextual data sensors.

25 Claims, 2 Drawing Sheets

PROCESS FOR AUTOMATICALLY DETERMINING A PROBABILITY OF IMAGE CAPTURE WITH A TERMINAL USING CONTEXTUAL DATA

FIELD OF THE INVENTION

The invention is for application in the field of electronic imaging. The invention relates to a process for using a terminal capable of capturing images to determine a probability of capturing the images according to information taken from contextual data provided by image capture means. The invention also makes it possible to capture sound data associated with the image capture, i.e. sounds can be emitted and modulated as the images are being captured.

More specifically, the invention relates to a process for using a terminal, such as a mobile terminal comprising at least one image sensor and at least one contextual data sensor, to automatically determine by calculation that a probability of capturing an image or a series of images (such as a video) occurs within a certain time interval. The capture probability is calculated based on responses given by the sensors.

BACKGROUND OF THE INVENTION

Digital image analysis, processing, compression and decompression means are key features in adjusting or enhancing the quality of images that are captured, received and sent using mobile terminals. In mobile imaging, the 'image chain' is mainly comprised of operations performed on the pixels within an image or a sequence of images, beginning for example with the capture of the image and extending up to the decompression of the image in order to display it, so that people can see the image correctly on, for example, a mobile terminal screen. The mobile terminal is, for example, a cell phone or a mobile camera phone, often called a 'phonecam'. This means that a phonecam can be used to capture an image or a sequence of images, after which this image or sequence of images can then be made to undergo various pixel processing processes. Processing a color image captured using a phonecam that is equipped with a CCD sensor consists, for example, in a CFA (Color Filter Array) interpolation using an algorithm in order to process each pixel in the image captured, taking into account primary color components, i.e. red, green and blue. The image can then be compressed to make it lighter in computer terms, the image weight being expressed in megabytes or gigabytes. The compression routine run may, for example, be a JPEG compression, which is a standardized compression procedure. Then, the image is decompressed when the compressed file is opened in order to view it correctly, for example on the screen of the phonecam, and possibly to listen to any sound data associated with the image data. In mobile imaging, all the abovementioned operations are routine image chain operations.

In addition to these operations performed in the image chain operation performed on pixel data, mobile terminals can also be equipped with data sensors designed to acquire and process a range of different contextual data associated with the images captures. The mobile terminal may, for example, be a phonecam equipped with a GPS module to gauge the geographical location of the terminal; this geographical location is a contextual data characterizing, for example, the place where the image was captured. This contextual data is frequently used as one of the image metadata.

However, these contextual data are only associated with the image as simple metadata, meaning that it does not play a role in actively improving the process of capturing a sequence of images, or more specifically, the process of capturing an image of the displayed sequence, for example, is being viewed at the same time on the screen of the mobile terminal.

Furthermore, mobile or portable terminals such as cameraphones or phonecams are generally relatively compact, and so consequently they have only limited energy and memory capacities. The energy capacity remains limited because the mobile terminal general has to carry its own energy, which means it is equipped with a low-capacity battery.

The process of efficiently working on images captured by digital camera devices in order to extract relevant data, for example the place where the shot was taken from, the people featuring in the shot or the action taking place in the scene of the photo, can be made easier by having access to additional data such as metadata or contextual data. This data makes it possible to calculate or directly extract key information on the semantic content of an image.

The best way to capture a context would be to continuously monitor that context both before and after the image capture: the quantity of contextual data associated with the image capture would then ensure that no important event would be missed later on in the 'image chain'. This is the underlying principle behind the electronic surveillance systems used in the security industry, where multiple sensors (visual, infrared, audio, etc.) are integrated into an environment to track and analyze a same scene. However, this kind of approach would not be viable if it had to be integrated into a mobile terminal, due to the terminal's energy consumption and storage and processing capacity of said terminal. More importantly, a mobile image capture terminal such as, for example, a phonecam or a digital camera, is only one component in the 'image chain'; consequently, the resulting increase in the data flow to be processed in the communication channel at every link in the chain (visual display, storage, print-out) would make it impractical to employ this kind of continuous contextual data acquisition process, for performance reasons and in terms of easiness to use of the mobile capture terminal.

Therefore, there is a need to reduce the quantity of contextual data to be processed while at the same time maintaining a high level of quality to allow the efficient exploitation of said data.

There is therefore an overriding need, given the limitations inherent to mobile terminals capable of producing shots, to optimize images capture and rendering using a capture device such as a phonecam or a cellphone equipped, for example, with an image sensor and contextual data sensors. One solution can consist in exploiting information coming from the contextual data associated with the images capture. Starting out with these contextual data, that leads to interpret the contextual data in order to capture the images in good conditions, by triggering, for example, the capture of one image with a specifically tailored pixel resolution.

The contextual data are intended to be used to optimize the management of an image or of a sequence of images capture, by taking into account the context, which may be progressive or fast-changing in an mobile imaging environment, while at the same time fitting the relatively modest memory and energy capacities of mobile image capture terminals. The contextual data can, therefore, be acquired and interpreted early on, for example during the visualization phase carried out using the phonecam's display, i.e. before an image is captured.

The optimization of the images capture, from the provision of contextual data has to resolve different problems, in regard to the power and calculation and memory capacity constraints inherent to mobile platforms or terminals capable of images capture. There are many different problems that have to be resolved: the management of contextual data associated with the images capture, i.e. the quality and sampling process of the contextual and images data captured over time; the image capture means and the processing means used on contextual data associated with the images captured; the saving and the storage of the images data and the associated contextual data; the means of processing contextual data, given the capacity constraints of mobile terminals capable of simultaneously capturing images and contextual data.

SUMMARY OF THE INVENTION

The invention relates to a method for using a terminal such as a phonecam to automatically determine a probability of images capture according to contextual data associated with these images. Both the image data and the contextual data are captured with the terminal. The capture parameters are adapted over a time interval that includes the images capture in order to palliate the issues of limited memory and energy capacities of the terminal. The terminal's CPU (Central Processing Unit) performs digital data transfer management and calculation operations. As it performs these operations, the CPU consumes more and more energy—which consequently decharges the terminal's battery faster—as greater volumes of data have to be captured. For example, the CPU consumes energy as soon as the terminal's screen or the image sensor are activated, or as soon as there is pressure on the button that releases image capture.

By adapting the images digital data capture parameters, it becomes possible, for example, to not record a video flux, i.e. a sequence of images, continuously and with a single pixel resolution. Another example of adapting digital data rendering parameters consists in only triggering the display of the video flux on the capture terminal's screen, from the moment the terminal is set in a particular position, for example horizontally or vertically, close to the capture.

It is a particular object of the invention to offer a process for using a terminal, such as a mobile or portable terminal comprising a first image data sensor and at least one contextual data sensor (or 'context sensor'), to automatically determine at least one probability of capturing an image or a sequence of images within a time interval, the probability of capture (or 'capture probability') being calculated based on at least one response provided by the activated image data and/or contextual data sensors. The capture probability is calculated according to a sequence according to which the response provided by at least one of the activated contextual data or image data sensors goes over or exceeds a pre-established value, preferably a number, of the output signal of said sensor. The capture probability can be used to adjust the quantity of contextual data captured to the severe energy and processing and storage constraints of mobile terminals, while at the same time guaranteeing an optimal quality of the data captured. The sequence represents a series or an ordered sequence that characterizes a chronology of the exceeding over the pre-established values respectively for each sensor comprised into the mobile terminal. The capture probability is generally expressed by a real number, comprised between 0 (zero) and 1 (one).

According to an optimized embodiment of the invention, the capture probability calculation and the pre-established value can advantageously be automatically modified according to a dataset related to a history of the sensor responses and capture times.

An object of the invention is that the data captured by the image data sensors and/or contextual data sensors have a capture quality and an acquisition frequency that are determined according to the capture probability. In a first, preferred embodiment of the invention, the data captured by the image data sensors and/or contextual data sensors have a capture quality and an acquisition frequency that increase, before the actual time of the capture, together with the capture probability.

In a second, preferred embodiment of the invention, the data captured by the image data sensors and/or contextual data sensors have a capture quality and an acquisition frequency that increase, before the actual time of the capture, as the time interval that maximizes the capture probability is close to the instant at which the capture probability calculation took place.

A third embodiment of the invention can advantageously combine both the preferred embodiments described above so as to, before the actual time of the capture, jointly increase both the capture quality and the acquisition frequency with the capture probability, and also to jointly increase both the capture quality and the acquisition frequency, as the time interval that maximizes the capture probability gets closer to the instant at which the capture probability calculation took place.

Another object of the invention, for each of the embodiments described above, is also that the data captured by the image data sensors and/or contextual data sensors have a data capture quality and an acquisition frequency that decrease after the moment the capture is done.

The data capture quality is, for example, advantageously a pixels resolution value for the image captured, expressed by a pixels density per unit of length, or a value for a number of images captured per second, or a value expressing a cutoff or power cut frequency for the sampling performed.

The datum captured by the contextual data sensor is a physical measurement taken when the sensor is activated. This physical measurement is advantageously operated constantly while the sensor is activated.

The contextual data sensors are fitted or placed on the terminal, i.e. integrated or built into the inside of the terminal, or else fixed to the terminal casing. Each contextual data sensor allows to capture a contextual datum specific to that sensor.

The contextual data sensor is, for example, a tilt sensor placed on the terminal. According to a particular embodiment of the invention, the pre-established value exceeding of the signal emitted by the tilt sensor corresponds to a measurement of a terminal's horizontal or vertical position.

The contextual data sensor is, for example, an acceleration sensor, such as an accelerometer, placed on the terminal in order to measure a movement transmitted to the terminal. According to a particular embodiment of the invention, the pre-established value exceeding of the signal emitted by the acceleration sensor corresponds to a measured zero or nil acceleration of the terminal.

The contextual data sensor is, for example, a pressure sensor working or cooperating with an image capture release button specific to the terminal. According to a particular embodiment of the invention, the exceeding of the pre-established value of the signal emitted by the pressure sensor corresponds to a non-zero pressure exerted on the image capture release button.

The contextual data sensor is, for example, a sound sensor, such as a microphone, fitted on the terminal. According to a particular embodiment of the invention, the exceeding of the pre-established value of the signal emitted by the sound sensor corresponds to a decibel value emitted by a sound source outside the terminal. The sound source is, for example, one or several loudspeakers connected to a CD (compact disk)

reader and that are installed in the environment of the terminal to produce a music recorded on a CD. The music thus produced can thus be captured with the sound sensor.

According to a particular embodiment of the invention, the exceeding of the pre-established value of the signal can correspond to a recognition of a particular sound, such as a laughter, a snap of fingers or of hands. The specific sound is determinedly emitted, in order to alert a mobile device, such as a phonecam, to the proximity of an event, for example of image capture. The specific sound determinedly emitted may also simply add to the sound surroundings during the image capture. The recognition of a particular sound can be achieved by previously learning a statistical series representative of sounds corresponding to the sounds that are earmarked for identification.

The contextual data sensor is, for example, a temperature sensor fitted on the terminal. According to a preferred embodiment of the invention, the terminal is a phonecam and the temperature sensor is built into the phonecam's image capture release button. This arrangement allows to measure the temperature of a phonecam user, at the time said user is about or ready to take shots. The temperature can, for example, indicate the fact that a shot is about or ready to be taken or imminent, since it is correlated with a level of stress of a person taking the shot, and thus it indicates that the photographer is concentrating before taking the shot. According to a particular embodiment of the invention, the exceeding of the pre-established value of the signal emitted by the temperature sensor corresponds to a temperature measurement taken on a person placing a finger on the shot release button.

The contextual data sensor is, for example, a resistivity sensor placed on the terminal in order to measure the emotional state of a person touching the resistivity sensor during a prehension of the terminal.

In a more elaborate embodiment of the invention, the contextual data sensor is an RFID (Radio Frequency Identification) type sensor fitted on the terminal in order to detect people or objects present within the active field of the sensor. If several people, such as two or three people, are detected, this may indicate that the terminal is about to be used to take a shot (the shot is imminent). In this case, the exceeding of the pre-established value of the signal emitted by the radiofrequency sensor corresponds to a detection of a number of people, for example two people, detected within the RFID sensor's active field. Similarly, if, for example, several targets objects are detected via their RFID or NFC (Near field Communication) tags (microchip), this would indicate that there is a potential scene of interest and therefore the probability of an image capture.

In a variant of this more elaborate embodiment of the invention, the contextual data sensor is a second image data sensor preferentially fitted on the rear of the terminal. The second image sensor works together with detection means integrated into the terminal, and allowing to detect a number of human faces present outside the field of the first image sensor and/or information inherent to the individual faces of the people detected. The information inherent to the faces are advantageously an emotional state, or a position, for example horizontal, of the face, or a speed of motion of the face in relation to the terminal.

In a more conventional embodiment of the invention, the contextual data sensor can also be, for example, a geographical localization sensor, such as a GPS sensor, placed on the terminal to measure the position of the terminal in the space. The exceeding of the pre-established value of the signal emitted by the GPS sensor corresponds to a measurement of latitude and longitude coordinates giving the position of the terminal in the space. The latitude and longitude coordinates are, for example, the coordinates for a tourist site or famous landmark, such as Piton de La Fournaise on Réunion Island.

It is another object of the invention to determine the probability of capturing an image or a sequence of images by taking into account the specific image capture mode of the terminal used to capture the image or the sequence of images. The terminal is advantageously a phonecam or digital camera phone comprising a CCD or CMOS image sensor and a display screen. The data captured when the image or the sequence of images or video is captured are preferably displayed on the screen of the digital camera phone. According to this embodiment of the invention, the digital camera phone is able to select an image capture mode. The terminal, such as the phonecam, is equipped with a means of selecting the image capture mode, such as portrait, landscape, panoramic or sport modes. The value of the signal emitted by the contextual data sensor and which defines the exceeding is either set beforehand or calculated based on the selected or programmed image capture mode.

Other characteristics and advantages of the invention will become clear on reading the following description, with reference to the various figures.

DETAILED DESCRIPTION OF THE INVENTION

The following description is a detailed description of the main embodiments of the invention, with reference to the drawings in which the same numerical references identify the same elements in each of the different figures.

Figure 1:
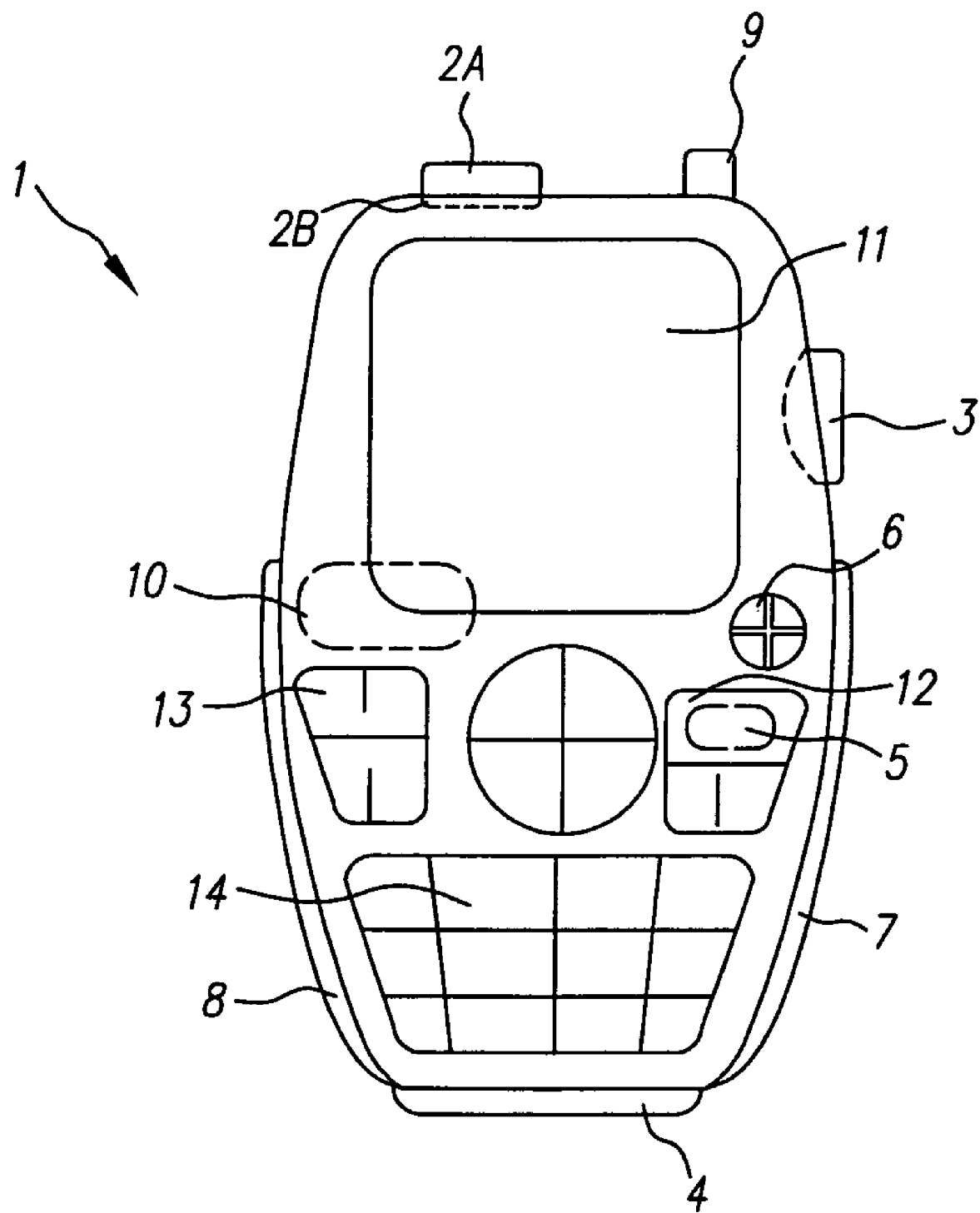
FIG. 1 shows an example of a mobile terminal equipped with data capture means used to implement the process according to the invention.

FIG. 1 shows a terminal 1 that comprises means of images capture and of capturing contextual data associated with the images captures. Terminal 1 is preferably a mobile terminal such as a digital camera phone comprising a keypad 14 and a display screen 11. The means of images capture are, for example, one or several CCD or CMOS images sensors. A first images sensor 2A is, for example, placed on the front face of the terminal 1, said front face comprising the display screen 11. A second image sensor 2B is placed on the opposite side, i.e. the rear of terminal 1. The second image sensor 2B works together, for example, with detection means (not shown) integrated into the terminal 1. The detection means are, for example, intended for detecting a number of human faces present outside the field of the first image sensor 2A and/or information inherent to the individual faces of the people detected. The information inherent to the faces are advantageously an emotional state, or a position, for example horizontal, of the face, or a speed of motion of the face in relation to the terminal 1.

The data captured when an image or a sequence of images, for example a video, is captured can be displayed on the display 11 of the digital camera phone 1.

The means of contextual data capture are, for example: a tilt sensor 3 placed on the terminal to measure a position, in the space, of the terminal; an acceleration sensor 4, such as an accelerometer, placed on the terminal to measure a movement transmitted to the terminal; a pressure sensor 5 that can cooperate with an image capture release button 12 of the terminal; a sound sensor 6, such as a microphone, fitted on terminal 1; a temperature sensor 7 placed on the terminal 1; a resistivity sensor 8 placed on the terminal 1 in order to measure the emotional state of a person touching the resistivity sensor 8 as she/he is holding the terminal 1; a radiofrequency sensor 9, for example an RFID sensor, placed on the terminal 1 in order to detect the constant or transitory presence of objects or people within the active field of the sensor 9 (an object can, for example, be brought closer to the camera so that it can be identified); a geographical localization sensor 10, such as a GPS sensor, placed on the terminal 1 in order to measure the position of the terminal 1 in the space.

In a preferred embodiment of the invention, the temperature sensor 7 is built into the image capture release button 12. By arranging the temperature sensor 7 in this way, it becomes possible to measure the temperature of a person placing a finger on the shot release button 12.

In an advantageous embodiment of the invention, the contextual data are captured and stored in a memory card, for example a flash SD (Secure Digital) or microSD card, which is inserted into the mobile terminal 1.

The contextual data are described as associated with the images captures, since capture parameters for an image or a sequence of images captured are determined according to a capture probability value. The capture parameters for the image or the sequence of images that govern the quality of the capture can, for example, advantageously be a pixel resolution value of the image (i.e. a number of pixels per millimeter) or a number of images captured per second.

The capture probability value is a real number ranging between zero (0) and one (1).

The probability that the capture of the image or of the sequence of images will take place within a time interval is calculated based on at least one response provided by one of the activated image data sensors and/or contextual data sensors. The capture probability is calculated based on a sequence, according to which the response provided by at least one of the activated image data sensors or contextual data sensors overshoots a pre-established value of the output signal from said sensor. This output signal pre-established value of the sensor is preferably a numerical value.

According to a preferred embodiment of the invention, the pre-established value and the capture probability calculation are automatically modified according to a dataset related to a history of the sensor responses and of the capture times. The history of the sensor responses and of the capture times is, for example, recorded in a database that can be accessed from the terminal 1.

The primary technical function of image sensors 2A and 2B is to capture image data in order to produce a digital image or a sequence of images, for example a video, to which context data, which are also known as contextual data, are then associated.

The context sensors or contextual data sensors together with the images sensors relating to the implementation of the process according to the invention can be used as contextual data sensors (or context sensors). In this case, their primary technical function is to produce context data that are associated with the image or the sequence of images.

The images sensors or contextual data sensors can also be employed as capture proximity sensors. In this scenario, their primary technical function is to trigger an event that governs the implementation of one or more context sensors.

The image sensor can also serve as a context sensor or a capture proximity sensor. A context sensor can, for example, be the image sensor or serve, either independently or at the same time, as a capture proximity sensor. Similarly, a capture proximity sensor can be activated and operate, either independently or at the same time, in an image sensor mode and/or as a context sensor. Consequently, certain sensors of the terminal 1 have a function that is interchangeable over time.

The sensors capable of being employed to implement the process according to the invention in the objective to enhance an image or a sequence of video images with context information at the time the image or the sequence of video images was captured, are, for example, preferably the image sensor 2A, the sound sensor 6, the pressure sensor 5, the acceleration sensor 4, the tilt or orientation sensor 3, the temperature sensor 7, the speed or acceleration sensor 4, the geographical localization or geolocation sensor 10, and the RFID or NFC radiofrequency sensor.

The moment from which a characteristic, called an event trigger criteria (CDE), that is measured from the response from one or several capture proximity sensors, overshoots a certain threshold, known as an activation threshold, is called a capture predictive event (EPS). This threshold represents a level of said characteristic that indicates an assumption that a shot is imminent, in a few seconds time, for example. A capture predictive event is detected when a shot is presumed. This prediction of an imminent capture is achieved based on heuristic rules deduced, for example, from a representative panel of users of terminals capable of digital images capture.

The moment from which the time after which the image sensor is programmed and used for taking shots, and not just used simply to search for a capture predictive event or for context capture, is called the capture point PDS.

A capture session is the time interval between the moment when the image sensor is activated and the moment it is deactivated. The deactivation may be voluntary, i.e. triggered by, for example, a key on the keypad 14 of the terminal 1. The deactivation may also have been programmed to take place automatically.

The measurements made from the response from each of the capture proximity sensors lead in the calculation of at least one capture probability P (t, D) in a time interval [t, t+D] following on from at least one capture predictive event EPS. For example, associated probability densities P(., D) will be tabulated for each combination of capture predictive events. The probability densities can be advantageously deduced from a representative panel of users of terminals capable of digital images capture.

From these capture probabilities, a capture probability index IPS is calculated. This capture probability index IPS can take a value that is the value of probability of the capture of at least one image during the time interval corresponding to the capture predictive event. For example, the capture probability index IPS can be expressed with the following ratio:

$$IPS = P(t_{EPS}, +\infty)/(1 + \text{argmax}(P(t_{EPS}+t, 0))) \qquad \text{equation 1.}$$

In this equation 1, the "argmax (P($t_{EPS}$+t, 0))" part of the divisor is the moment at which the probability of capture is at a maximum: it is therefore the supposed capture point PDS relative to the capture predictive event EPS.

A particular set of contextual data sensors which are triggered and used in coordination to detect a predictive capture event constitutes a special context sensors network RPCC.

The names interruption event or predictive capture event interruption are used to describe the moment where P($t_{EPS}$+t, 0) is below a certain threshold, for example the moment where a value for a sensor signal drops below a certain threshold.

Context capture window PSC is the name given to the time interval between the EPS and the interruption.

There may be a series of predictive capture events and interruptions occurring during the same capture session. It therefore follows that several context capture windows may temporarily coexist. Hence, a global capture probability index IPS is calculated from each individual IPS; associated with the context capture window PSC. For example:

global $IPS=\text{maximum}(IPS_i)$  equation 2.

Each context capture window is characterized by the implementation of a special context sensors network RPCC, in which each sensor has to be adjusted in order to acquire a signal at a given capture quality and at a given acquisition frequency.

The context sensors can be parameterized according to two embodiments: either once and for all, when the context capture window is created, and from the IPS for each window, or else the parametering is done depending on and adapted to the other open context capture windows, from the global IPS.

Figure 2:
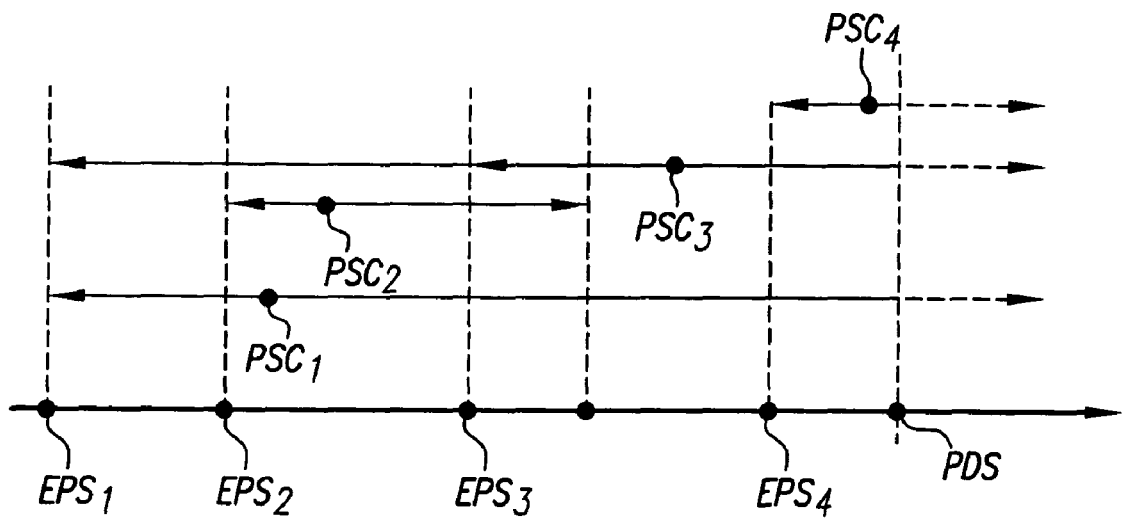
FIG. 2 shows a diagram of one example of the implementation of the process according to the invention.

FIG. 2 shows a diagram of one example of the implementation of the process according to the invention. The capture point PDS is, for example, the presumed moment from which the image sensor 2A is used to capture one or several images. Four capture predictive events are shown: $EPS_1$; $EPS_2$; $EPS_3$; $EPS_4$. Their four corresponding context capture windows are respectively: $PSC_1$; $PSC_2$; $PSC_3$; $PSC_4$.

Figure 3:
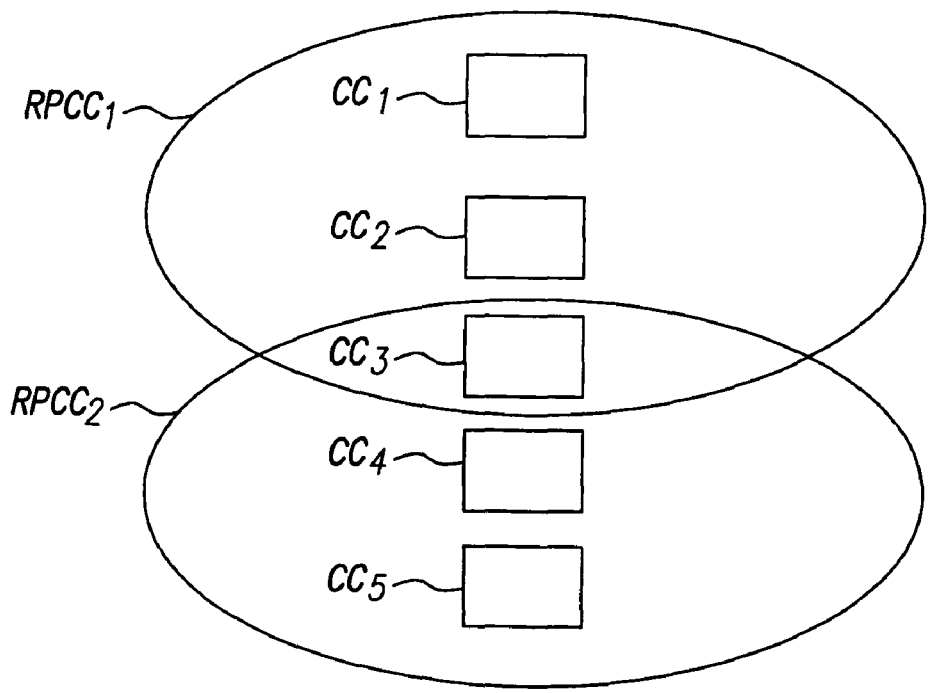
FIG. 3 illustrates special networks of context sensors used to implement the example presented in FIG. 2.

FIG. 3, for example, illustrates the first two special context sensors networks $RPCC_1$ and $RPCC_2$ used to implement the example presented in FIG. 2. These two special context sensors networks $RPCC_1$ and $RPCC_2$ correspond to the context capture windows $PSC_1$ and $PSC_2$, respectively. When the $RPCC_1$ associated with $PSC_1$ is activated, this requires three context sensors $CC_1$, $CC_2$ and $CC_3$ to be parameterized. When the $RPCC_2$ associated with $PSC_2$ is activated, this requires three context sensors $CC_3$, $CC_4$ and $CC_5C_3$ to be parameterized.

$EPS_1$ is a moment that represents, for example, an assumption that a shot is imminent. The corresponding context data capture quality will tend to be low, as will the corresponding acquisition frequency. $EPS_2$ is the moment from which the $RPCC_2$ is activated and the context sensors $CC_3$, $CC_4$ and $CC_5$ are parameterized. Just before $EPS_2$, the last two sensors $CC_4$ and $CC_5$ are either not yet activated or are simply in a mode or a status qualified as 'on standby'. In this last 'standby' mode, there can only be a very low contextual data capture with the sensors $CC_4$ and $CC_5$.

Context sensors $CC_3$, $CC_4$ and $CC_5$ are parameterized according to rules associated with the context capture window $PSC_2$. Context sensor $CC_3$, common to both special context sensors network $RPCC_1$ and $RPCC_2$, can be parameterized differently depending on the embodiment of the invention concerned. For example, since the capture predictive event $EPS_2$ is closer to the supposed capture point PDS, then better capture quality and acquisition frequency can be chosen. In this case, the parametering options for the acquisition frequency $Fa(CC_3)$ of the sensor $CC_3$ would be, for example:

$Fa(CC_3)=\text{maximum}[Fa(CC_3) \text{ in } EPS_1, Fa(CC_3) \text{ in } EPS_2]$  equation 3.

Similarly, the capture quality $Q_C$ of the contextual data produced by the context sensor $CC_3$ would be, for example:

$Q_C(CC_3)=\text{maximum}[Q_C(CC_3) \text{ in } EPS_1, Q_C(CC_3) \text{ in } EPS_2]$  equation 4.

According to FIG. 2, the horizontal axis such as drawn does not strictly represent the time axis. In fact, the capture predictive event $EPS_1$ is not necessarily triggered before the event $EPS_2$. However, the event $EPS_1$ is further away from the supposed capture point PDS, in the sense that:

$\text{argmax}(P(t_{EPS1}+t,0))>\text{argmax}(P(t_{EPS2}+t,0))$  equation 5.

The event trigger criteria CDE is calculated directly from the signal emitted by the capture proximity sensor, when its response overshoots or exceeds a certain threshold, called activation threshold. The activation threshold corresponds to a pre-established value, preferably numerical, of the output signal of said sensor. The event trigger criterion CDE is deduced directly from the signal given by the sensor, after the application of a temporal filtration. The temporal filtration allows to smooth the measurement data and to reduce the sensitivity to too important local variations, and non-representative, for example, in the real-time behavior of the user of the terminal 1, or in the real-time evolution of the shot environment surrounding the terminal 1.

According to FIG. 1, if the capture proximity sensor is, for example, the tilt sensor 3, this sensor provides a measurement ($inc_t$) of the tilt of the terminal 1 at a given instant (t), for example, in relation to a horizontal or vertical position of the terminal. Tilt measurements are, for example, subjected to real-time filtering ($inc'_t$) using a low-pass filter; this process may involve a slight lag (of a few tenths of a second) between the measurement and the comparison test to a threshold. When, for example, the horizontal position of the terminal 1 is detected as becoming a lasting action (lasting a few seconds) and therefore an interpretable action, then a capture predictive event EPS is triggered. In this example, the event trigger criterion CDE is defined as the accumulation ($\text{accum}_T inc_t$) of filtered, binarized tilt measurements values ($bin\ inc_t$) over a time interval T in relation to a local horizontal position threshold $S_h$. This means that the filtered, binarized tilt measurement value will equal zero (0), if it is less than the local horizontal position threshold. This means that the filtered, binarized tilt measurement value will equal one (1), if it is greater than or equal to the local horizontal position threshold. In this case, we can record:

$bin\ inc_t=1 \text{ if } inc'_t \geq S_h$  equation 6.

$bin\ inc_t=0 \text{ if } inc'_t < S_h$  equation 7.

The corresponding event trigger criterion (CDE) is therefore:

$$\text{accum}_T inc_t = \sum_{t \in T} bin inc_t.$$  equation 8

The associated capture predictive event (EPS) is triggered when the $\text{accum}_T inc_t$ value obtained during the time interval T is greater than a threshold $T_h$. This threshold $T_h$ is defined, for example, as being the successive accumulation of representative samples of the local horizontal position $S_h$ after which the hypothesis is done that it describes an interpretable behavior of the terminal.

According to FIG. 1, if the capture proximity sensor is, for example, the acceleration sensor 4, this sensor gives a measurement ($acc_t$) of the acceleration transmitted to the terminal 1 at a given instant (t). This acceleration corresponds, for example, to a movement that a terminal user gives to the terminal 1 when performing a preliminary step before taking a shot.

In an improved embodiment of the invention, the terminal 1 can comprise several accelerometers 4, with each accelerometer providing an acceleration measurement value measured according to a given direction. The number of acceleration measurement directions is advantageously three directions, which takes into account accelerations on the three main dimensions in the space. Acceleration measurements are, for example, subjected to real-time filtering (acc'$_t$) using a low-pass filter; this process may involve a slight lag (of a few tenths of a second) between the measurement and the comparison test with a threshold. When an acceleration of the capture terminal 1 is detected in one of these directions, it is likely that the user of the terminal 1 is not yet ready to capture the image or images of the scene she/he intends to photograph, and that they are actually, for example, in the process of identifying which part of the scene interests her/him the most. A capture predictive event can therefore be triggered when the acceleration values are consecutively below a threshold (pre-established value) over a time interval T, and this, regardless of the direction considered. In this example, the event trigger criterion CDE is defined as the accumulation (accum$_T$ acc$_t$) of filtered, binarized acceleration measurements values (bin acc$_t$) over the time interval T, in relation to a local acceleration threshold (Sa$_i$). In this case, we can record:

$$bin\ acc_t = 1\ if\ acc'_t \geq Sa_i \forall i \in [1,3] \quad \text{equation 9.}$$

$$bin\ acc_t = 0\ if\ acc'_t < Sa_i \forall i \in [1,3] \quad \text{equation 10.}$$

The index i of equations 9 and 10 represents one of the three acceleration directions, i.e. the acceleration values must be below the threshold Sa$_i$ for the three directions, so that the descriptor bin acc$_i$ is set to a value of 'one'. The corresponding event trigger criterion CDE is therefore:

$$accum_T acc_t = \sum_{t \in T} bin acc_t. \quad \text{equation 11}$$

The associated capture predictive event EPS is triggered when the accum$_T$ acc$_t$ value obtained during the time interval T is greater than a local acceleration threshold $T_a$. The threshold $T_a$ is defined, for example, as being the successive accumulation of samples representative of an absence of local acceleration $T_a$ after which the hypothesis is done that it describes an interpretable behavior of the terminal.

The embodiment of the invention described is compatible with the scenario wherein the user of the terminal 1 captures a photo or a video in a system of reference receiving a translation movement, such as for example a car or a train in which the user of the terminal 1 is seated.

According to FIG. 1, if the proximity sensor is, for example, the image sensor 2A, this sensor acquires, for example, a frame (im$_t$) at time t. The capture proximity sensor can also be comprised of two image sensors 2A and 2B, with each of these sensors capturing for example an image in a given direction.

The camera terminal 1 is advantageously a mobile phone called a 3G (third generation) mobile phone, which presents the feature of being equipped with one camera on one side of the phone (the front face) and another camera on the opposite (rear) side.

According to another embodiment of the invention, the camera terminal 1 is equipped with two lenses focusing along the same direction, but with different focal lengths and/or different apertures, or with different sensitivities in different frequency bands. In this example, the capture proximity sensor is also potentially a contextual data sensor, while at the same time also being the image sensor.

It is consequently necessary to establish sampling rules for coordinating the captures made over time, depending on the status of the image sensor(s) 2A, 2B: capture proximity sensor mode; contextual data sensor (or context sensor) mode; image capture mode.

In the particular embodiment of the invention that follows, the terminal 1 comprises an optic sensor (or images sensor) 2A with native VGA (Video Graphics Array) resolution: (640×480) pixels. This optical sensor is in capture proximity sensor mode and it captures an image that is spatially subsampled by a factor of four. The resolution of the image subsampled by a factor of four is therefore: (160×120) pixels. In this capture proximity sensor mode of functioning, a capture is for example made every second (one capture/second). Let us suppose that a capture predictive event EPS is triggered from the visual content produced by the optical sensor 2A. The associated special context sensors network RPCC includes this image sensor being used in context capture mode. Since by definition, the capture predictive event EPS means a presumed imminent capture, sensor 2A can be also set in context capture mode in order, for example, to advantageously produce images at a higher acquisition frequency as well as with a higher level of capture quality. In the same time interval, the image sensor can remain in capture proximity sensor mode in order to detect any interruptions.

Consequently, a given sensor can be set to operate simultaneously in different modes, which implies a simultaneous management and control of captures made at different quality and sampling levels.

If, for example, the image sensor 2A, in capture proximity mode, acquires in QQVGA (Quarter-QVGA) a (160×120) pixels per second frame, it is possible that this same sensor, in context capture mode, captures one image every half-second or quarter-second at a higher resolution, for example (320×240) pixels in QVGA (Quarter VGA). The captures in context capture mode can also come in between.

When a context capture is executed at the same time as a capture in capture proximity mode (every two or four images in the example above), a preferred embodiment of the invention allows, from the highest-resolution image, to produce a derived image that has sub-optimal quality compared with a target resolution. The images can advantageously be compressed with a parameterized and hierarchical coding technology such as JPEG 2000; this allows to use different quality levels that are directly incorporated into the encoded data.

In the example where image data sensors can directly capture a video, an adaptive encoding of the sensor is carried out according to the sensor status. The capture proximity mode generates a sub-optimal dataset which is encoded, for example, to a lower level of capture quality using a lower number of what are called intra-coded frames (i.e. there is no time-based prediction with neighboring frames that produce a higher quality) and a higher number of inter-coded frames (commonly called P ('predictive') frames and B ('backward') frames).

The 2D data (two spatial directions), 3D data (three dimensions) or (2D+t) in the case of a spatio-temporal capture, all of which are provided by an imager set in capture proximity sensor mode, cannot be directly exploited without a preliminary analysis of their content.

Multiple types of CDE (event trigger criteria) can be considered from, for example, a presence of faces detected in the shooting field, synonymous with a possible interest for the shot terminal user. Expressions or behaviors recognitions (smiles, frowns, open eyes, etc.) can also be used. In a functioning mode of the shot terminal 1 which does not include the sport mode that is possible for the terminal, the decrease in the quantity of movement related to objects present in the scene to be shot, may also be the indication that people present in the scene are getting ready to be filmed or photographed.

An analysis of the variations in photometric and colorimetric distributions can determine the moment when the shot conditions are compatible with a satisfactory level of image capture quality. When the image analysis component dedicated to the adjustment of the shot parameters of the shot terminal reaches a stability in terms of speed/aperture ratio and of sensitivity, it is likely that the point of capture is imminent.

In the case where the imager set in capture proximity sensor mode detects, for example, the presence of a face and in close-up, at a certain time (t), the resulting capture predictive event EPS can be triggered as soon as at least one face is detected. The facial detection can be implemented according to the process described in U.S. Pat. No. 6,940,545. This capture predictive event EPS can, for example, to trigger the activation of an audio sensor, to store possible words said by the person whose the face has been detected. It is also possible to change the status of the image sensor and to change it to the context capture mode, or to a mode combining contextual data capture and capture of capture proximity.

According to FIG. 1, if the capture proximity sensor is the pressure sensor 5, which is typically built into the shot release button on a digital photographic apparatus, then, a pressure only half as the shot release pressure can trigger a capture predictive event EPS. The functioning mode of the most part of digital photographic apparatus starts the focusing when the user gives a half-press on the release button. This action therefore determines with a very high probability that an image capture is imminent.

The capture predictive event EPS generating a very low (i.e. capture probability value close to zero) capture probability index IPS is the powering-up of the shot terminal 1. Activations of the tilt sensors 3 and of the acceleration sensors 4 result in a higher IPS. The simultaneity of the capture predictive events linked with the tilt and with the acceleration results in an even higher global IPS, since it corresponds to a higher presumption of image capture.

The capture predictive events EPS resulting from a visual flows analysis offer a relatively wide temporal interval for presumed image capture. The presence of faces within the field of view, synonymous with a potential interest to capture an image, or the recognition of certain expressions or of certain behaviors on a face (smile, open eyes, etc.) can be interpreted differently, depending on the quality of the information extracted. An algorithm known as an object detection algorithm or shape recognition algorithm for an image or a sequence of images, from an analysis of the image or of the sequence of images, allows for example to detect a face in a zone of the image with an 85% detection probability. The process according to the invention allows to exploit this probabilistic information to weight the data acquisition frequency and data capture quality. The context capture can also advantageously be a function of the quantity of information extracted. For example, the acquisition frequency is more accurate if three faces are detected, rather than just two.

In an advantageous embodiment of the invention, the process for arranging the capture predictive events EPS is made easier by using other information, such as, for example, the image capture mode of the shot terminal 1. The image capture mode on the shot terminal 1 is, for example, selected with a capture mode button 13. For example, the capture probability indices IPS corresponding to 'faces detection' EPS and 'open eye and/or smile recognition' EPS (capture predictive events) have higher capture probability values when the capture mode selected is the 'portrait' mode. A low amount of local movement also takes a greater importance in this capture mode. On the other hand, in a 'landscape' mode, the faces and expressions detection has a lower importance. In a 'sport' capture mode, a higher quantity of local movement results in a higher capture probability index IPS.

Although it is possible to arrange the capture predictive events EPS according to the supposed proximity of an image capture, the process according to the invention allows, for example, the release button 12 to be pressed as soon as the shot apparatus 1 is powered up, in which case the context extraction (contextual data capture) is performed immediately at a maximum capture quality. Similarly, the user can decide to take a photograph by tilting the shot apparatus 1 by 45° to the right, in order to achieve a special effect. In this case, the capture predictive event EPS linked to this tilt action is not triggered. However, other capture predictive events EPS are triggered to replace this one.

The sampling of the data acquisition frequencies and of the data capture quality depends on the type of sensor employed. The quantification of the data captured as well as their output or the space used to represent said data must all be adapted. The data quantification can, for example, be done with a storage onto a more or less reduced number of bits. The data output can, for example, be done by operating an audio or video compression step, or more generally a compression with or without loss. The space used to represent the data is, for example, monochromatic versus colorimetric for the image, stereo versus mono for the sound, or multidirectional versus monodirectional for an accelerometers network, for example.

In any case, the temporal and qualitative sub-sampling rules are governed by a generalization of equations 1 and 2 to N number of capture predictive events. For a given context sensor $CC_i$, the generalization of equation 1 is written:

$$Fa(CC_i) = \text{maximum}[Fa(CC_i) \text{ in } EPS_1, Fa(CC) \text{ in } EPS_2, \ldots, Fa(CC_i) \text{ in } EPS_N] \quad \text{equation 12.}$$

The generalization of equation 3 is written:

$$Q_C(CC_i) = \text{maximum}[Q_C(CC_i) \text{ in } EPS_1, Q_C(CC_i) \text{ in } EPS_2, \ldots, Q_C(CC_i) \text{ in } EPS_N] \quad \text{equation 13.}$$

The invention has been described in detail with reference to its preferred embodiments. However, it is clear that variants can be produced within the scope of the claims.

The invention claimed is:

1. A process to automatically determine with a mobile terminal comprising a first image data sensor and at least one contextual data sensor, at least one probability that a capture of an image or of a sequence of images occurs within a time interval, the probability of capture being calculated from at least one response provided by one of the image data and/or contextual data sensors when said sensor is activated.

2. The process according to claim 1, wherein the probability of capture is calculated according to a sequence according to which the response provided by at least one of the activated contextual data or image data sensors exceeds a pre-established value, preferably numerical, of the output signal of said sensor.

3. The process according to claim 2, wherein the calculation of the probability of capture and the pre-established value are automatically modified according to a dataset related to a history of the sensor responses and of the capture moments.

4. The process according to claim 2, wherein the probability of capture is expressed as a numerical value comprised between 0 and 1.

5. The process according to claim 1, wherein the data captured by the image data and/or contextual data sensors have a capture quality and an acquisition frequency that are determined according to a value of probability of capture.

6. The process according to claim 5, wherein the data captured by the image data and/or contextual data sensors have a capture quality and an acquisition frequency that increase, before the moment of the capture, with the probability of capture.

7. The process according to claim 1, wherein the data captured by the image data and/or contextual data sensors have a capture quality and an acquisition frequency that increase, before the moment of the capture, all the more that the interval that maximizes the probability of capture is close to the instant at which the capture probability calculation has taken place.

8. The process according to claim 1, wherein the data captured by the image data and/or contextual data sensors have a data capture quality and an acquisition frequency that both decrease after the moment of the capture.

9. The process according to claim 1, wherein the data captured by the contextual data sensor is a physical measurement operated continually when the sensor is activated.

10. The process according to any one of claims 5 to 8, wherein the data capture quality is a pixels resolution value for the image captured, expressed by a pixel density per unit of length.

11. The process according to any one of claims 5 to 8, wherein the data capture quality is a value for a number of images captured per second.

12. The process according to claim 1, wherein the contextual data sensor is a tilt sensor placed on the terminal.

13. The process according to claim 1, wherein the contextual data sensor is an acceleration sensor placed on the terminal, such as an accelerometer, for measuring a movement transmitted to the terminal.

14. The process according to claim 1, wherein the contextual data sensor is a pressure sensor cooperating with an images capture release button of the terminal.

15. The process according to claim 1, wherein the contextual data sensor is a sound sensor, such as a microphone, placed on the terminal.

16. The process according to claim 1, wherein the contextual data sensor is a temperature sensor placed on the terminal.

17. The process according to claim 16, wherein the temperature sensor is comprised into the images capture release button.

18. The process according to claim 1, wherein the contextual data sensor is a resistivity sensor placed on the terminal, for measuring an emotional state of a person who exerts a touch on the resistivity sensor during a prehension of the terminal.

19. The process according to claim 1, wherein the contextual data sensor is an RFID or NFC type sensor placed on the terminal, for detecting people or objects present within the action field of the sensor.

20. The process according to claim 1, wherein the contextual data sensor is a geographical localization sensor, such as a GPS sensor, placed on the terminal for measuring the position of the terminal in the space.

21. The process according to claim 1, wherein the contextual data sensor is a second image data sensor preferentially placed on the rear of the terminal, said second image sensor cooperating with detection means built into the terminal to detect a number of human faces present outside the capture field of the first image sensor and/or information inherent to the individual faces of these detected people.

22. The process according to claim 21, wherein the information inherent to the faces are an emotional state; a position, for example horizontal, of the face; a speed of motion of the face in relation to the terminal.

23. The process according to claim 2, wherein the terminal has a means for selecting an images capture mode, such as a portrait mode, or landscape mode, or panoramic mode, or sport mode, the value of the signal emitted by the contextual data sensor defining the exceeding being pre-established or calculated according to the selected images capture mode.

24. The process according to claim 1, wherein the mobile terminal is a digital camera phone comprising a CCD or CMOS image sensor and a display screen.

25. The process according to claim 5, wherein the contextual data are captured and stored with a flash memory card, for example a SD (Secure Digital) or micro SD card, that is inserted into the mobile terminal.

\* \* \* \* \*